US011313609B2

(12) United States Patent
Xia

(10) Patent No.: US 11,313,609 B2
(45) Date of Patent: Apr. 26, 2022

(54) ELECTRONIC COOLING ANTI-CONDENSATION SYSTEM, AND ANTI-CONDENSATION METHOD FOR SAME

(71) Applicant: Dongguan City Simplewell Technology Co., Ltd, Guangdong (CN)

(72) Inventor: Keyu Xia, Guangdong (CN)

(73) Assignee: DONGGUAN CITY SIMPLEWELL TECHNOLOGY CO., LTD, Dongguan (CN)

( * ) Notice: Subject to any disclaimer, the term of this patent is extended or adjusted under 35 U.S.C. 154(b) by 102 days.

(21) Appl. No.: 16/603,591

(22) PCT Filed: Aug. 2, 2018

(86) PCT No.: PCT/CN2018/098217
§ 371 (c)(1),
(2) Date: Oct. 8, 2019

(87) PCT Pub. No.: WO2019/109649
PCT Pub. Date: Jun. 13, 2019

(65) Prior Publication Data
US 2021/0108848 A1  Apr. 15, 2021

(30) Foreign Application Priority Data
Dec. 8, 2017  (CN) .......................... 201711290069.2

(51) Int. Cl.
*F25D 21/04* (2006.01)
*G05D 27/02* (2006.01)
*B01L 1/02* (2006.01)

(52) U.S. Cl.
CPC ............. *F25D 21/04* (2013.01); *G05D 27/02* (2013.01); *B01L 1/025* (2013.01);
(Continued)

(58) Field of Classification Search
CPC ..... F25D 21/04; F25D 2700/14; G05D 27/02; B01L 1/025; B01L 2300/10;
(Continued)

(56) References Cited

U.S. PATENT DOCUMENTS 9,804,071 B2 * 10/2017 Inoue ........................ B01L 7/00
2009/0014548 A1 * 1/2009 Criss ........................ F24F 13/22
236/44 C
2017/0282679 A1 * 10/2017 Tsai .................... B60H 1/00478

FOREIGN PATENT DOCUMENTS

CN          101551179 B  *  2/2011
CN          104538866 A  *  4/2015
(Continued)

OTHER PUBLICATIONS

Luo 2 Translation (Year: 2011).*
(Continued)

*Primary Examiner* — Kun Kai Ma
(74) *Attorney, Agent, or Firm* — Bayramoglu Law Offices LLC

(57) ABSTRACT

The present disclosure discloses an electronic cooling anti-condensation system, and an anti-condensation method for the same. The system comprises a testing chamber, electronic cooling plates, temperature sensors, a temperature and humidity sensor, a cooling plate control unit, and a main controller. The main controller is electrically connected to the temperature sensors, the temperature and humidity sensor, and the cooling plate control unit. The main controller is capable of calculating a dew point value of the air in the testing chamber according to a temperature value and a humidity value of the interior the testing chamber acquired by the temperature and humidity sensor, and if the dew point value of the air is greater than a pre-determined threshold, the main controller controls the cooling plate control unit to reduce the number of operating electronic cooling plates or (Continued)

output powers of the electronic cooling plates, wherein the pre-determined threshold is a temperature $T1°$ C. of the electronic cooing plate or a temperature $T1+n°$ C. of the electronic cooling plate acquired by the temperature sensor, and $n \leq$ is less than or equal to 10. The present disclosure achieves real-time control of operation states of the electronic cooling plates, thereby realizing redundant control of the cooling plates, and preventing the cooling plates from causing condensation in the chamber body, so as to achieve continuous operation when a failure occurs.

9 Claims, 1 Drawing Sheet

(52) U.S. Cl.
CPC ..... *B01L 2200/147* (2013.01); *B01L 2300/10* (2013.01); *B01L 2300/1894* (2013.01); *F25D 2700/14* (2013.01)

(58) Field of Classification Search
CPC .............. B01L 300/1894; F24F 13/22; F24F 2013/221; F24F 2003/144
See application file for complete search history.

(56) References Cited

FOREIGN PATENT DOCUMENTS

| EP | 2813838 A1 * | 12/2014 | .......... G01M 99/008 |
| WO | WO-2013042553 A1 * | 3/2013 | .............. F25B 21/02 |
| WO | WO-2017162917 A1 * | 9/2017 | ............... E06B 7/12 |

OTHER PUBLICATIONS

Luo Translation (Year: 2015).*
Kobayashi Translation (Year: 2016).*
Maeda Translation (Year: 2013).*
Virtanen Translation (Year: 2017).*

* cited by examiner

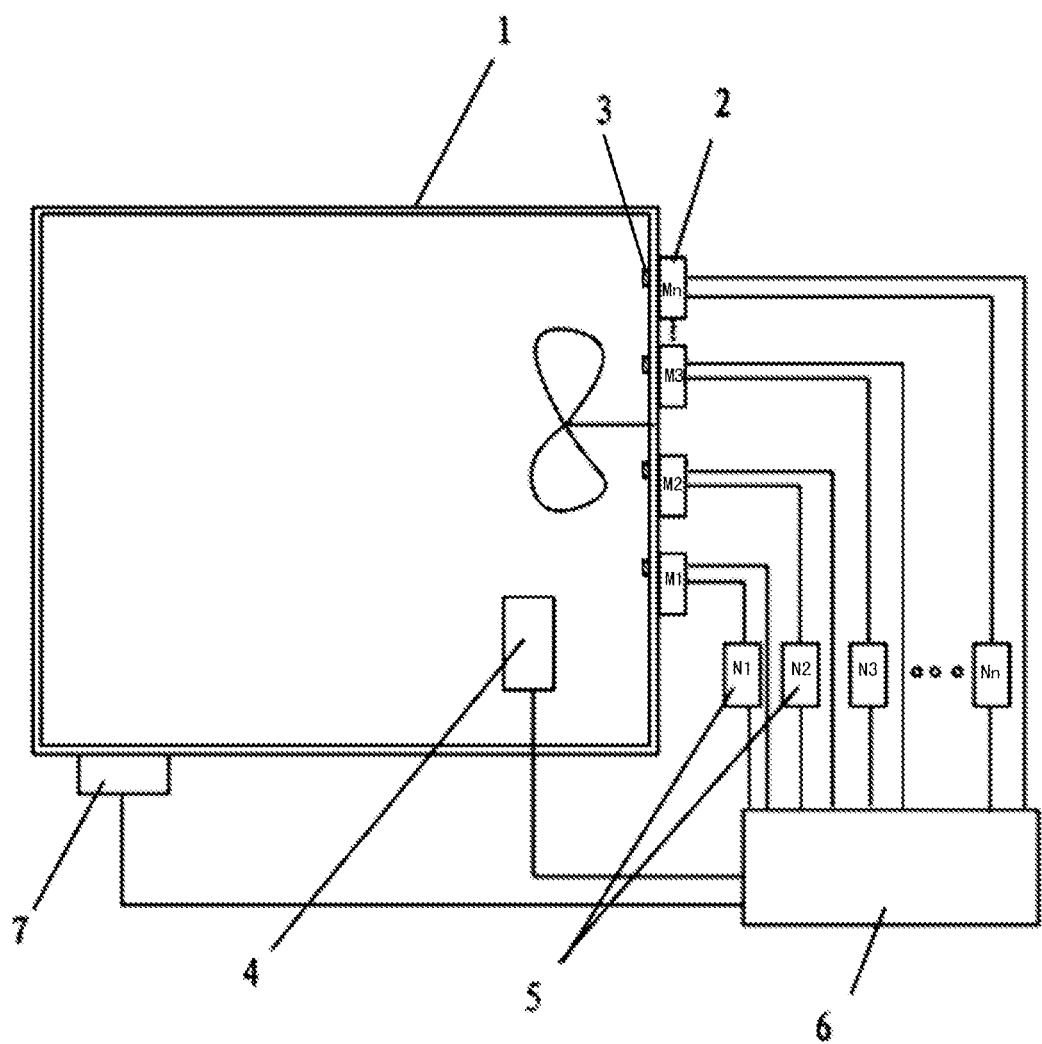

ELECTRONIC COOLING ANTI-CONDENSATION SYSTEM, AND ANTI-CONDENSATION METHOD FOR SAME

BACKGROUND OF THE INVENTION

The present disclosure relates to the technical field of detecting devices, and more specifically, to an electronic cooling anti-condensation system and an anti-condensation method for the same.

Materials of the existing furniture, car accessories and the like contain volatile hazardous air such as formaldehyde, volatile organic compound (VOC) and the like, and when the concentration of the volatile hazardous air exceeds a certain range, the volatile hazardous air will cause harm to human bodies. Reasonable collection of the volatile hazardous air such as the formaldehyde, the VOC and the like in the materials is an important link of the detection technology.

Currently, there are multiple devices for testing the release amount of the volatile hazardous air such as the formaldehyde, the VOC and the like in the industry, and these devices can cool or heat by electronic cooling plates. However, the electronic cooling plates usually cause condensation in a testing chamber of the device during cooling to influence test effects.

BRIEF SUMMARY OF THE INVENTION

An objective of the present disclosure is to provide an electronic cooling anti-condensation system and an anti-condensation method for the same, in which a cooling plate anti-condensation manner is provided, the redundant control of the cooling plates is achieved and continuous operation when a failure occurs is achieved, in order to overcome the defects in the prior art.

To achieve the above objective, a first aspect of the present disclosure provides an electronic cooling anti-condensation system, which comprises a testing chamber, and further comprises:

electronic cooling plates, used for cooling and/or heating, wherein there is at least one group of the electronic cooling plates, each group of the electronic cooling plates are respectively mounted on a chamber wall of the testing chamber, and one end part of the electronic cooling plate dissipates heat outside the testing chamber while the other part thereof is fixed on the chamber wall or the interior of the testing chamber;

temperature sensors, used for detecting temperatures of the electronic cooling plates, wherein the temperature sensors are mounted on a part, close to an inner side of the testing chamber, of each group of the electronic cooling plates, or a common part, close to an inner side of the testing chamber, of all electronic cooling plates, or the chamber wall, or cooling fins, close to the interior of the testing chamber, of the electronic cooling plates;

a temperature and humidity sensor, used for detecting a temperature and a humidity of the interior of the testing chamber, wherein the temperature and humidity sensor is mounted at the interior of the testing chamber;

a temperature adjustment circuit, used for controlling operation and/or stop of the electronic cooling plates, wherein the temperature adjustment circuit is electrically connected with the corresponding electronic cooling plate one to one, or is electronically connected with all the electronic cooling plates one to multiple; and a controller, electrically connected to the temperature sensors, the temperature and humidity sensor, and the temperature adjustment circuit, and used for calculating a dew point value of the air in the testing chamber according to a temperature value and a humidity value of the interior of the testing chamber acquired by the temperature and humidity sensor and controlling the temperature adjustment circuit to reduce the number of operating electronic cooling plates or output powers of the electronic cooling plates if the dew point value of the air is greater than a pre-determined threshold, wherein the pre-determined threshold is a temperature $T1°$ C. of the electronic cooling plate or a temperature $T1+n°$ C. of the electronic cooling plate acquired by the temperature sensor, and n is greater than 0 and less than or equal to 10.

As a preferable embodiment, after obtaining a temperature and a humidity of the interior of the testing chamber acquired by the temperature and humidity sensor, the controller calculates a dew point value of the air corresponding to the temperature and the humidity according to a stored dew point table.

As a preferable embodiment, the temperature adjustment circuit is further used for judging whether the electronic cooling plate operates regularly by detecting an output power, a current or a voltage of the electronic cooling plate.

As a preferable embodiment, the controller is further used for automatically switching off a working circuit of an electronic cooling plate which generates a failure, and starting a spare electronic cooling plate or maintaining other electronic cooling plates to regularly operate when the temperature adjustment circuit detects that the electronic cooling plate generates the failure.

As a preferable embodiment, the controller is further used for prompting a serial number of the electronic cooling plate which generates the failure when the temperature adjustment circuit detects that the electronic cooling plate generates the failure.

As a preferable embodiment, the controller identifies the serial number of the electronic cooling plate which generates the failure by detection of the temperature adjustment circuit and/or detection of the temperature sensors.

As a preferable embodiment, the controller is further used for repeatedly activating a working circuit of a changed electronic cooling plate after the electronic cooling plate which generates the failure is changed.

A second aspect of the present disclosure provides an anti-condensation method for the electronic cooling anti-condensation system, which comprises the following steps:

(1), by the temperature and humidity sensor, acquiring a temperature and a humidity of the interior of the testing chamber in real time, and by the temperature sensors, detecting temperatures of the electronic cooling plates in real time; and (2), calculating a dew point value of the air in the testing chamber according to the temperature and the humidity, which is obtained by the controller and acquired by the temperature and humidity sensor, of the interior of the testing chamber, wherein, if the dew point value of the air is greater than a pre-determined threshold, the temperature adjustment circuit is controlled to reduce the number of operating electronic cooling plates or output powers of the electronic cooling plates, and the pre-determined threshold is a temperature $T1°$ C. of the electronic cooling plate or a temperature $T1+n°$ C. of the electronic cooling plate acquired by the temperature sensor, and n is greater than 0 and less than or equal to 10.

Compared with the prior art, beneficial effects of the present disclosure lie in:

the present disclosure achieves real-time control of operation states of the electronic cooling plates, thereby realizing redundant control of the cooling plates, and preventing the cooling plates from causing condensation in the chamber body, so as to achieve continuous operation when a failure occurs.

BRIEF DESCRIPTION OF THE DRAWINGS

To describe the technical solutions in the embodiments of the present disclosure or the prior art more clearly, the following briefly introduces the accompanying drawings required for describing the embodiments or the prior art. Apparently, the accompanying drawings in the following description show some embodiments in the present disclosure, and a person of ordinary skill in the art may still derive other drawings from these accompanying drawings without creative efforts.

FIG. 1 is a schematic structural diagram of an electronic cooling anti-condensation system.

DETAILED DESCRIPTION OF THE INVENTION

To make the objectives, technical solutions, and advantages of the embodiments of the present disclosure clearer, the following dearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure. All other embodiments obtained by a person of ordinary skill in the art based on the embodiments of the present disclosure without creative efforts shall fall within the protection scope of the present disclosure.

Referring to FIG. 1, an embodiment of the present disclosure provides an electronic cooling anti-condensation system, and the system comprises a testing chamber 1, electronic cooling plates 2, temperature sensors 3, a temperature and humidity sensor 4, a temperature adjustment circuit 5 and a controller 6. The following describes each component in detail with reference to the accompanying drawings.

The electronic cooling plates 2 are used for cooling and/or heating, there is at least one group of the electronic cooling plates 2 (such as M1, M2, . . . , Mn), each group of the electronic cooling plates 2 are respectively mounted on a chamber wall of the testing chamber 1, and one end part of the electronic cooling plate dissipates heat outside the testing chamber while the other part thereof is fixed on the chamber wall or the interior of the testing chamber.

The temperature sensors 3 are used for detecting temperatures of the electronic cooling plates 2, the temperature sensors 3 are mounted on a part, close to an inner side of the testing chamber, of each group of the electronic cooling plates 2, or a common part, close to the inner side of the testing chamber, of all electronic cooling plates, or the chamber wall, or cooling fins, close to the interior of the testing chamber, of the electronic cooling plates.

The temperature and humidity sensor 4 is used for detecting a temperature and a humidity of the interior of the testing chamber 1, and the temperature and humidity sensor 4 is mounted at the interior of the testing chamber 1.

The temperature adjustment circuit 5 is used for controlling operation and/or stop of the electronic cooling plates 2, there is at least one temperature adjustment circuit 5 (such as N1, N2, . . . , Nn), the temperature adjustment circuit 5 is electrically connected with the corresponding electronic cooling plate 2 one to one, or is electronically connected with all the electronic cooling plates 2 one to multiple.

The controller 6 can be chosen from existing available controllers known to a person skilled in the art, for example, a FX3U main unit manufactured by Mitsubishi. The controller 6 is electrically connected to the temperature sensors 3, the temperature and humidity sensor 4, and the temperature adjustment circuit 5 and is used for calculating a dew point value of the air in the testing chamber 1 according to a temperature value and a humidity value of the interior of the testing chamber 1 acquired by the temperature and humidity sensor 4 and controlling the temperature adjustment circuit 5 to reduce the number of operating electronic cooling plates 2 or output powers of the electronic cooling plates 2 if the dew point value of the air is greater than a pre-determined threshold, wherein the pre-determined threshold is a temperature T1° C. of the electronic cooling plate 2 or a temperature T1+n° C. of the electronic cooling plate 2 acquired by the temperature sensor 3, and n is greater than 0 and less than or equal to 10.

In the embodiment, after obtaining a temperature and a humidity of the interior of the testing chamber 1 acquired by the temperature and humidity sensor 4, the controller 6 calculates a dew point value of the air corresponding to the temperature and the humidity according to a stored dew point table, wherein the dew point table can be obtained according to the literature or the textbook.

In the embodiment, the temperature adjustment circuit 5 is further used for judging whether the electronic cooling plate 2 operates regularly by detecting an output power, a current or a voltage of the electronic cooling plate 2.

In the embodiment, the controller 6 is further used for automatically switching off a working circuit of an electronic cooling plate 2 which generates a failure, and starting a spare electronic cooling plate 2 or maintaining other electronic cooling plates 2 to regularly operate when the temperature adjustment circuit 5 detects that the electronic cooling plate 2 generates the failure.

In the embodiment, the controller 6 is further used for prompting a serial number of the electronic cooling plate 2 which generates the failure when the temperature adjustment circuit 5 detects that the electronic cooling plate 2 generates the failure.

In the embodiment, the controller 6 identifies the serial number of the electronic cooling plate 2 which generates the failure by detection of the temperature adjustment circuit 5 and/or detection of the temperature sensors 3. The two failure judgment manners can be used respectively or commonly.

In the embodiment, the controller 6 is further used for repeatedly activating a working circuit of a changed electronic cooling plate 2 after the electronic cooling plate 2 which generates the failure is changed.

Furthermore, a first temperature sensor 7 is mounted at the exterior of the testing chamber and is used for detecting an ambient temperature, and if the ambient temperature is lower than the dew point of the air in the testing chamber, the controller 6 prompts a possible condensation risk of a testing chamber sampling opening and/or performs a temperature regulation process on a sampling pipe.

Furthermore, the present disclosure provides an anti-condensation method for the electronic cooling anti-condensation system, which comprises the following steps:

(1), by the temperature and humidity sensor 4, acquiring a temperature and a humidity of the interior of the testing chamber 1 in real time, and by the temperature sensors 3, detecting temperatures of the electronic cooling plates 2 in real time; and (2), calculating a dew point value of the air in the testing chamber 1 according to the temperature and the humidity, which is obtained by the controller 6 and acquired by the temperature and humidity sensor 4, of the interior of the testing chamber 1, wherein, if the dew point value of the air is greater than a pre-determined threshold, the temperature adjustment circuit 5 is controlled to reduce the number of operating electronic cooling plates 2 or output powers of the electronic cooling plates 2, and the pre-determined threshold is a temperature T1° C. of the electronic cooling plate 2 or a temperature T1+n° C. of the electronic cooling plate 2 acquired by the temperature sensor 3, and n is greater than 0 and less than or equal to 10.

To sum up, the present disclosure achieves real-time control of operation states of the electronic cooling plates, thereby realizing redundant control of the cooling plates, and preventing the cooling plates from causing condensation in the chamber body, so as to achieve continuous operation when a failure occurs.

The above-mentioned embodiments are preferred embodiments of the present disclosure, but the implementation manner of the present disclosure is not limited to the embodiments. Any other changes, modifications, substitutions, combinations and simplifications without departing from the spirit essence and the principle of the present disclosure should be included within the protection scope of the present disclosure.

What is claimed:

1. An electronic cooling anti-condensation system, comprising a testing chamber, wherein the system further comprises:
    electronic cooling plates, used for cooling and/or heating, wherein there is at least one group of the electronic cooling plates, each group of the electronic cooling plates are respectively mounted on a chamber wall of the testing chamber, and a first end part of the electronic cooling plates dissipates heat outside the testing chamber while the other a second end part of the electronic cooling plates is fixed on the chamber wall or an interior of the testing chamber;
    temperature sensors, used for detecting temperatures of the electronic cooling plates, wherein the temperature sensors are mounted on a part on an inner side of the testing chamber, of each group of the electronic cooling plates;
    a temperature and humidity sensor, used for detecting a temperature and a humidity of the interior of the testing chamber, wherein the temperature and humidity sensor is mounted at the interior of the testing chamber;
    a temperature adjustment circuit, used for controlling operation and stop of the electronic cooling plates, wherein the temperature adjustment circuit is electrically connected with the corresponding electronic cooling plates one to one, or is electronically connected with all the electronic cooling plates one to multiple; and
    a controller, electrically connected to the temperature sensors, the temperature and humidity sensor, and the temperature adjustment circuit, and used for calculating a dew point value of air in the testing chamber according to a temperature value and a humidity value of the interior of the testing chamber acquired by the temperature and humidity sensor and controlling the temperature adjustment circuit to reduce a number of operating electronic cooling plates of the electronic cooling plates if the dew point value of the air is greater than a pre-determined threshold, wherein the pre-determined threshold is a temperature T1° C. of the electronic cooling plate or a temperature T1+n° C. of the electronic cooling plate acquired by one of the temperature sensors, and n is greater than 0 and less than or equal to 10.

2. The electronic cooling anti-condensation system according to claim 1, wherein after obtaining the temperature and the humidity of the interior of the testing chamber acquired by the temperature and humidity sensor, the controller calculates the dew point value of the air corresponding to the temperature and the humidity according to a stored dew point table.

3. The electronic cooling anti-condensation system according to claim 1, wherein the temperature adjustment circuit is further used for judging whether the electronic cooling plates operate regularly by detecting an output power, a current or a voltage of the electronic cooling plates.

4. The electronic cooling anti-condensation system according to claim 1, wherein the controller is further used for automatically switching off a working circuit of one of the electronic cooling plates which generates a failure, and starting a spare electronic cooling plate or maintaining other electronic cooling plates to regularly operate when the temperature adjustment circuit detects that the one of the electronic cooling plates generates the failure.

5. The electronic cooling anti-condensation system according to claim 4, wherein the controller is further used for prompting a serial number of the one of the electronic cooling plates which generates the failure when the temperature adjustment circuit detects that the one of the electronic cooling plates generates the failure.

6. The electronic cooling anti-condensation system according to claim 4, wherein the controller identifies a serial number of the one of the electronic cooling plates which generates the failure by detection of the temperature adjustment circuit and/or detection of the temperature sensors.

7. The electronic cooling anti-condensation system according to claim 4, wherein the controller is further used for repeatedly activating a working circuit of a changed electronic cooling plate after the one of the electronic cooling plates which generates the failure is changed.

8. The electronic cooling anti-condensation system according to claim 1, wherein a first one of the temperature sensors is mounted at the exterior of the testing chamber and is used for detecting an ambient temperature, and if the ambient temperature is lower than the dew point value of the air in the testing chamber, the controller prompts a possible condensation risk of a testing chamber sampling opening and/or performs a temperature regulation process on a sampling pipe.

9. An anti-condensation method for the electronic cooling anti-condensation system according to claim 6, wherein the method comprises the following steps:
    (1), by the temperature and humidity sensor, acquiring the temperature and the humidity of the interior of the testing chamber in real time, and by the temperature sensors, detecting the temperatures of the electronic cooling plates in real time; and (2), calculating the dew point value of the air in the testing chamber according to the temperature and the humidity, which is obtained by the controller and acquired by the temperature and humidity sensor, of the interior of the testing chamber, wherein, if the dew point value of the air is greater than the pre-determined threshold, the temperature adjustment circuit is configured to reduce the number of operating electronic cooling plates of the electronic cooling plates, and the pre-determined threshold is the temperature $T1°$ C. of the electronic cooling plate or the temperature $T1+n°$ C. of the electronic cooling plate acquired by one of the temperature sensors and n is greater than 0 and less than or equal to 10.

* * * * *